US008333951B2

(12) United States Patent
Muehlen

(10) Patent No.: US 8,333,951 B2
(45) Date of Patent: Dec. 18, 2012

(54) METHOD FOR PRODUCING A PRODUCT GAS RICH IN HYDROGEN

(76) Inventor: Heinz-Juergen Muehlen, Essen (DE)

( * ) Notice: Subject to any disclaimer, the term of this patent is extended or adjusted under 35 U.S.C. 154(b) by 599 days.

(21) Appl. No.: 12/311,919

(22) PCT Filed: Oct. 16, 2007

(86) PCT No.: PCT/EP2007/008943
§ 371 (c)(1),
(2), (4) Date: May 13, 2009

(87) PCT Pub. No.: WO2008/046578
PCT Pub. Date: Apr. 24, 2008

(65) Prior Publication Data
US 2010/0119440 A1   May 13, 2010

(30) Foreign Application Priority Data

Oct. 18, 2006   (DE) .......................... 10 2006 049 701
Feb. 6, 2007    (DE) .......................... 10 2007 005 799

(51) Int. Cl.
*C01B 3/26* (2006.01)
(52) U.S. Cl. ........................ 423/652; 423/650; 423/651
(58) Field of Classification Search .................. 423/650, 423/651, 652
See application file for complete search history.

(56) References Cited

U.S. PATENT DOCUMENTS

| | | | |
|---|---|---|---|
| 2,676,909 A * | 4/1954 | Bethea | 208/78 |
| 4,110,193 A | 8/1978 | Gwyn et al. | |
| 7,077,878 B1 | 7/2006 | Muehlen et al. | |
| 2004/0035788 A1 * | 2/2004 | Schmid et al. | 210/634 |
| 2004/0060236 A1 * | 4/2004 | Yoshikawa et al. | 48/63 |

FOREIGN PATENT DOCUMENTS

| | | |
|---|---|---|
| DE | 1 090 632 | 10/1960 |
| DE | 199 45 771 | 2/2001 |
| DE | 10 2006 019 452 | 10/2007 |
| EP | 1 226 222 | 7/2002 |
| EP | 1 865 045 | 12/2007 |
| WO | WO 96/32163 | 10/1996 |
| WO | WO 99/31197 | 6/1999 |
| WO | WO 01/68789 | 9/2001 |

OTHER PUBLICATIONS

International Search Report, May 23, 2008.

* cited by examiner

*Primary Examiner* — Paul Wartalowicz
(74) *Attorney, Agent, or Firm* — Collard & Roe, P.C.

(57) ABSTRACT

A method produces a product gas rich in hydrogen. A starting material including carbon is split via pyrolysis, and the resulting gas is mixed with water vapor to increase the hydrogen content and heated. The heat necessary comes from the combustion of the produced pyrolysis coke. The heat necessary for individual process steps is fed via a heat transfer medium circuit having a heating zone heated via flue gas from the pyrolysis coke firing. The gas/water vapor mixture is subsequently heated in a reaction zone. The heat transfer medium heats the starting material in a pyrolysis zone indirectly, without directly contacting the starting material, is cooled in a cooling zone, and subsequently returns to the beginning of the circuit. Upstream of the heating zone, the heat transfer medium is preheated via the hot product gas.

12 Claims, 2 Drawing Sheets

METHOD FOR PRODUCING A PRODUCT GAS RICH IN HYDROGEN

CROSS REFERENCE TO RELATED APPLICATIONS

Figure 1:
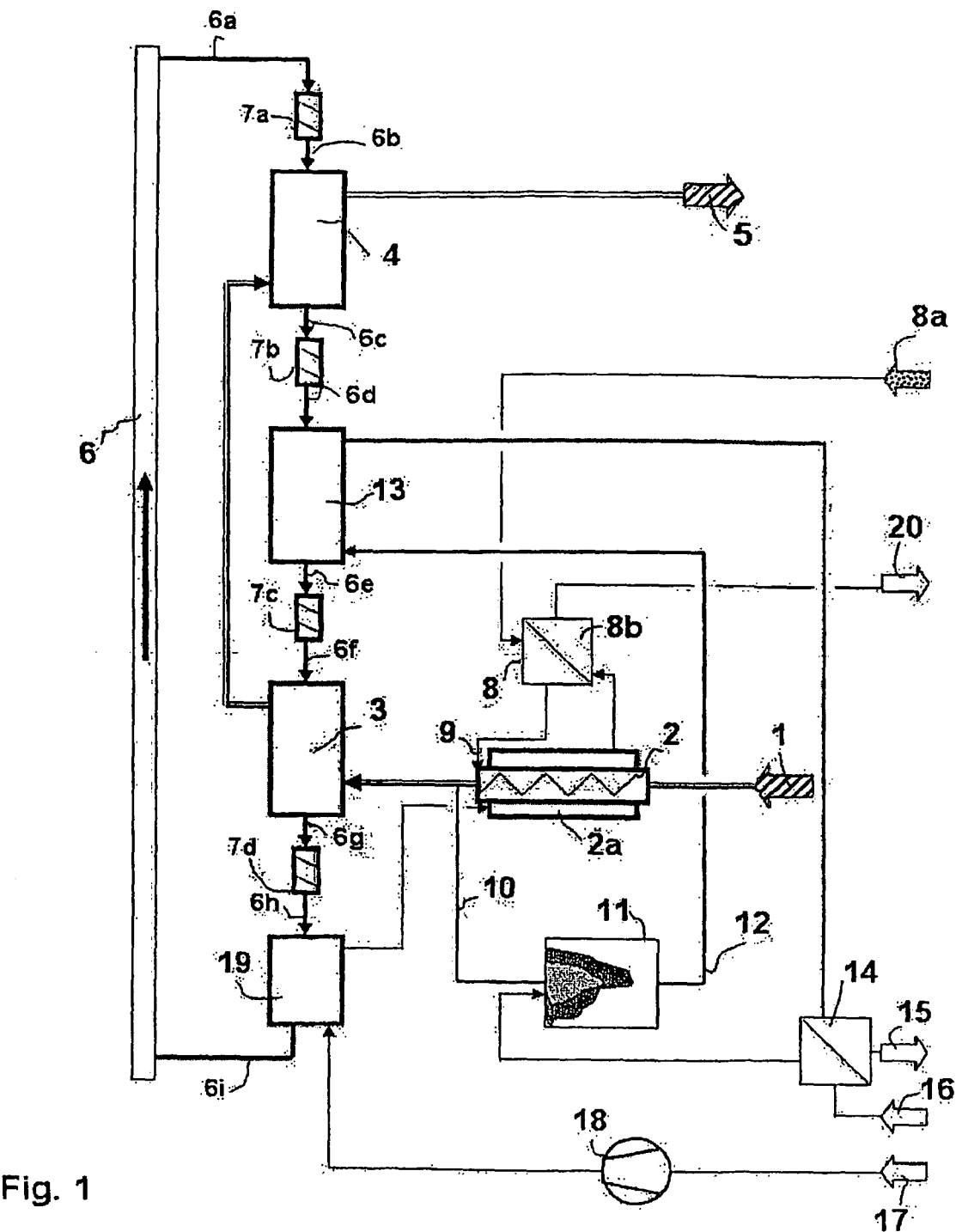

This application is the National Stage of PCT/EP2007/008943 filed on Oct. 16, 2007, which claims priority under 35 U.S.C. §119 of German Application No. 10 2006 049 701.5 filed on Oct. 18, 2006 and German Application No. 10 2007 005 799.9 filed on Feb. 6, 2007. The international application under PCT article 21(2) was not published in English.

The invention relates to a method for producing a product gas rich in hydrogen, having a high heating value, from a starting material in the form of organic substances or substance mixtures, in which the starting material is split up into a solid residue containing carbon, and pyrolysis gas as a volatile phase, in a pyrolysis zone, by means of pyrolysis, and the pyrolysis gases are mixed with steam as a reactant, and subsequently heated in a reaction zone, in such a manner that a product gas having a high heating value is formed, whereby the heat required for the pyrolysis and the subsequent heating is derived, at least for the most part, from the combustion of the solid residues of pyrolysis that contain carbon, and is supplied to the system as a bulk material that serves as a heat carrier, transported in a circuit, which is heated in a heating zone with flue gases from the combustion of the residues that contain carbon, subsequently brought into contact with the mixture of pyrolysis gas and steam in the reaction zone, then introduces at least part of its palpable heat into the pyrolysis zone, and subsequently is passed back to the beginning of the heat carrier circuit by means of a bulk material conveyor.

Such a method is known, for example, from EP 1 226 222 B1. In this method, the bulk material used as the heat carrier comes into direct contact with the starting material, which is introduced in pieces or small pieces, in the pyrolysis zone, and subsequently has to be separated from the pyrolysis coke that was formed during pyrolysis, in mechanical or fluid-mechanical (wind screening) manner. This step can be difficult, because of the composition of the coke that is produced, but is also made more difficult, in general, because of the circumstance that it must take place at approximately 550° C. At this relatively high temperature, the pyrolysis coke is an extremely flammable and combustible material. Another disadvantage of this method lies in the fact that the bulk material that serves as the heat carrier must be passed back into the heating zone at 550° C. Handling of such hot bulk material is complicated. Another disadvantage consists in that the base temperature of the process is defined by this relatively high temperature. Heat streams below this temperature can no longer be used directly in the process, because they are too low in value in terms of energy. Another disadvantage consists in that the temperature of the product gas at the exit of the process lies at 950° C., so that not only the purification of the gas that is usually necessary, but also cooling from this very high temperature must be carried out.

According to the state of the art, indirectly heated pyrolysis apparatuses are known (cf. Contherm system in the Hamm-Uentrop RWE power plant built by Technip GmbH). These indirectly heated pyrolysis apparatuses avoid the disadvantage of the separation of pyrolysis coke and heat carrier medium that is otherwise necessary.

Furthermore, steam gasification devices are known, as "Pyrator-Vergaser" (document published by NRP Natur-Rohstoff-Pyrolyse GmbH, Aitrangerstr. 7,87847 Unterthingau, Germany), which convert the organic substance to be gasified in one step, in a pyrolysis pipe that is heated with product gas, for example, to pyrolysis coke, and then convert the pyrolysis gas with the coke in a further gasification reaction, in order to thereby obtain a product gas that is rich in hydrogen. In this connection, the starting material is transported through the pyrolysis pipe with a conveyor screw, and brought into contact with the heated pipe wall in this manner.

It is the task of the present invention to further develop the method of the type stated initially, in such a manner that on the one hand, the advantage of introducing heat using the heat carrier circuit is utilized, in other words an intensive heat exchange is achieved, while the heating surfaces constantly stay clean, and in which method, on the other hand, the problematic separation of heat carrier (bulk material) and pyrolysis coke is avoided. Furthermore, in the new method, as much heat as possible is supposed to be withdrawn from the product gas, with at least partial removal of any tar that might be present in the product gas. Finally, the method is supposed to be improved in terms of heat technology, in other words more waste heat amounts are supposed to be coupled in and made useful in the method, to the greatest extent possible.

To accomplish this task, the invention proposes, proceeding from a method of the type stated initially, that a preheating zone is provided in the heat carrier circuit, ahead of the heating zone, in which preheating zone the bulk material is preheated with the hot product gas that comes from the reaction zone, and in this connection, takes up the greatest part of its heat, and that the heat transfer from the bulk material to the starting material, in the pyrolysis zone, takes place indirectly and without direct contact with the bulk material.

The method according to the invention continues to be operated with a heat carrier circuit composed of bulk material. However, in contrast to the state of the art according to EP 1 226 222 B1, the heat carrier circuit is expanded with a preheating zone that comes ahead of the heating zone, in which preheating zone the product gas is cooled off, on the one hand, and on the other hand, the bulk material that acts as the heat carrier is preheated. Cooling of the product gas in this preheating zone goes so far that a large part of the tars, which have a high boiling point, is already removed from the product gas. At the same time, the product gas is freed of a large part of the entrained dust. In particular, a large part of the heat contained in the product gas at first is kept in the heat carrier circuit as the result of this measure, and thus is retained for the process. Another significant advantage of the method according to the invention, as compared with the state of the art according to EP 1 226 222 B1, consists in that the bulk material that serves as the heat carrier no longer comes into direct contact with the starting material in the pyrolysis zone. This has the advantage, on the one hand, that the bulk material that serves as the heat carrier no longer needs to be separated from the solid pyrolysis products that remain during pyrolysis. On the other hand, it is easily possible, with this method step, to significantly cool the heat carrier further, for example to a base temperature of 220° C. or less. At such a low base temperature, the return transport of the bulk material that serves as the heat carrier, back to the beginning of the heat carrier circuit, is significantly easier. Furthermore, the heat losses in the region of the bulk material conveyor can be significantly reduced.

It is practical if the pyrolysis of the starting material is carried out in a temperature range of 500° C. to 700° C., preferably in a temperature range of 550° C. to 650° C. This temperature range can be precisely adjusted and maintained in the method according to the invention.

Furthermore, it is provided that the mixture of pyrolysis gas and steam is heated, in the reaction zone, to 750° C. to 1000° C., preferably to 900° C. to 1000° C. If these temperature ranges are maintained, the hydrogen yield is the best.

In order to further improve the reaction in the reaction zone, which is also called reforming, this can be carried out in the presence of a catalyst.

In this connection, a catalyst that accelerates the reaction is added to the bulk material that serves as the heat carrier, and transported in the circuit with it. This is easily possible, because in the method according to the invention, the bulk material that serves as the heat carrier and the catalyst added to it do not come into direct contact with the starting material. For the same reason, the consumption of catalyst material is also minimal.

The heat carrier, which is transported in the circuit as a bulk material, preferably consists of fireproof substances such as sand, gravel, crushed stone, aluminosilicate, corundum, greywacke, quartzite, or cordierite. All these substances are sufficiently stable mechanically, fireproof, and inert with regard to the other substances present, so that they can remain in this circuit for a long time.

Alternatively, the heat carriers can also consist of ceramic molded bodies, whereby the ceramic mixture is selected in such a manner that the ceramics fired from it optimally fulfill the above requirements.

It is practical if the transport of the heat carrier in the heat carrier circuit takes place exclusively by means of gravity, with the exception of the region of the bulk material conveyor. As already explained above, the temperature of the bulk material transported in the circuit as the heat carrier can be lowered to a base temperature of less than 220° C. in the region of the bulk material conveyor, so that there, the bulk material conveyor can work without problems. In all other regions, the transport takes place by means of gravity, which has the particular advantage that no mechanical means with which the bulk material is put into motion are required there.

A preferred embodiment of the method according to the invention provides that the indirect heat transfer from the heat carrier to the starting material, in the pyrolysis zone, takes place by way of an intermediary, gaseous heating medium, which is heated up in the cool-down zone of the heat carrier circuit, and subsequently gives off part of the heat it has absorbed to the starting material to be pyrolysed, by way of the heating mantle of the pyrolysis apparatus, whereby the heat carrier circuit is intensively cooled in the cool-down zone ahead of entry into the bulk material conveyor. The use of this intermediary, gaseous heating medium makes it possible to adjust the aforementioned base temperature at the end of the heat carrier circuit, on the one hand, and the temperature required for pyrolysis, on the other hand, to the required values, in targeted manner.

If necessary, the cool-down zone of the heat carrier circuit, on the one hand, and the heating mantle of the pyrolysis apparatus, on the other hand, can be combined in a housing, into a single unit. This unit has the aforementioned heating medium flowing through it, which medium cools off the bulk material used as the heat carrier, on the one hand, and on the other hand heats up the starting material that passes through the pyrolysis apparatus.

So that no heat is lost, it is furthermore provided that the residual heat that remains in the gaseous medium behind the pyrolysis zone is used to generate the steam that is required for the process.

Furthermore, it is provided, in order to avoid heat losses, that the flue gas that leaves the heating zone of the heat carrier circuit is used for preheating the combustion air for combustion of the solid residues of pyrolysis that contain carbon.

Figure 2:
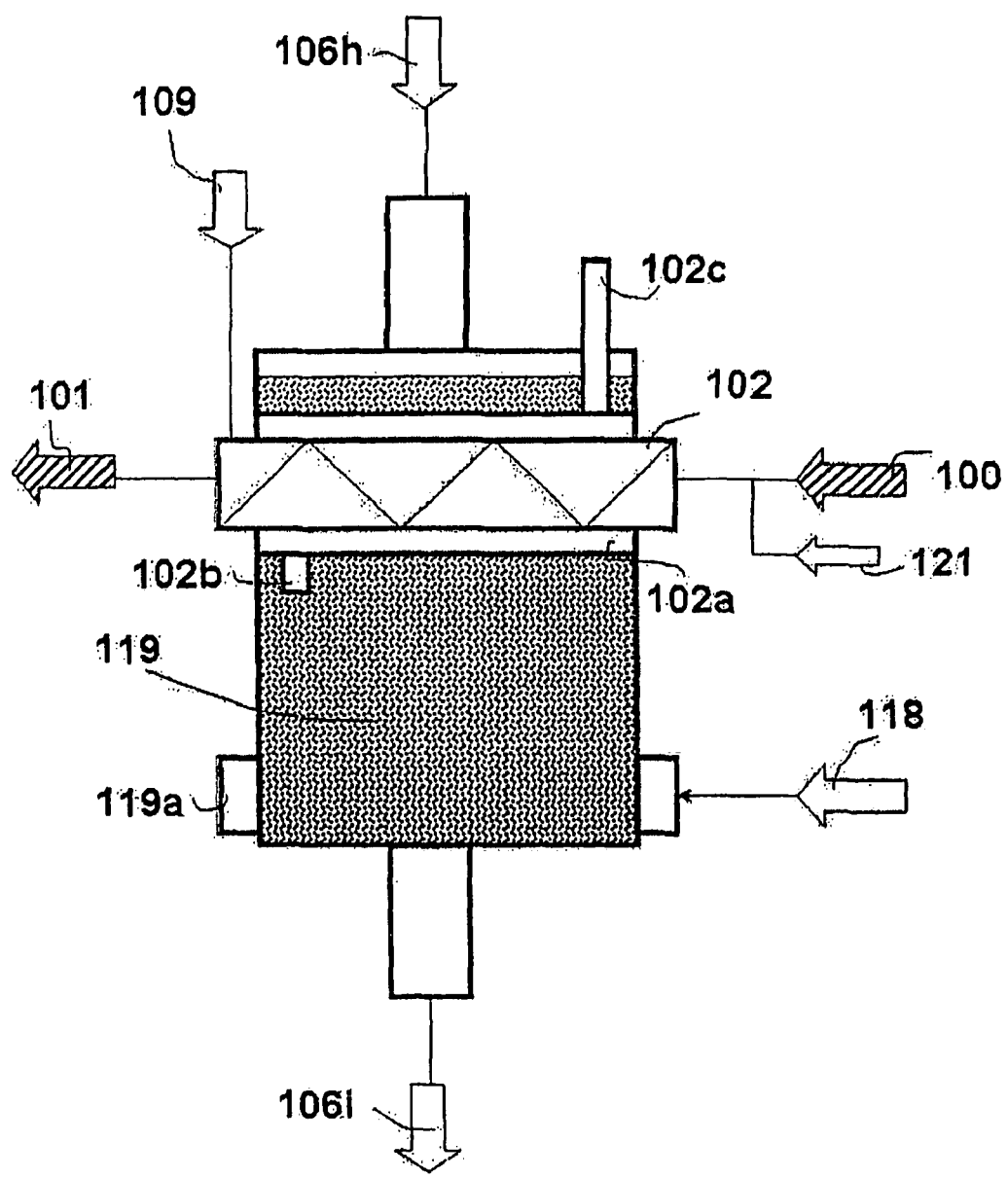

Two exemplary embodiments of the invention will be explained in greater detail in the following, using the drawing. This shows:

FIG. 1 schematically, the method sequence in a first embodiment;

FIG. 2 the same method sequence, with a modified pyrolysis apparatus.

The main process line consists of the addition of the starting material 1 in the form of organic substances or substance mixtures, the pyrolysis zone 2 having the heating mantle 2a, the reaction zone 3, also called the reformer, in which the pyrolysis gas is heated further, together with the steam added as a reactant, at the application point 9 within the pyrolysis zone 2, then the preheating zone 4 provided according to the invention, in which the product gas from the reaction zone 3 is cooled off and partially purified, so that a relatively low-dust and low-tar product gas 5 is delivered as the product of the method. The reactant steam is produced from supplied water 8a in a saturated steam boiler 8. The requirements concerning the quality of the water 8a used are quite low, due to the configuration of the boiler 8 and the selection of the steam parameters (saturated steam at less than 20 bar).

By means of the selection of the method parameters, i.e. atmospheric system pressure, temperature of up to 700° C. at the end of the pyrolysis zone 2, and 950° C. on the raw gas side, at the end of the reaction zone 3, as well as the steam amount, which leads to steam concentrations of more than 30 vol.-% in the uncooled product gas, the result is achieved that the hydrogen concentration, at more than 35 vol.-%, and the heating value, at typically more than 9 MJ/Nm$^3$, are very high. Supplementally, it should be noted, with regard to the atmospheric system pressure, that the system is generally operated at a slight excess pressure, primarily for safety reasons, preferably at up to 200 hPa, but this has practically no effect on the kinetics of the method described.

This main process line is heated by means of a heat carrier circuit having a bulk material conveyor 6 that runs vertically upward, and the route segments 6a to 6i that follow it. Preferably, transport of the heat carrier in the segments 6a to 6i takes place exclusively by means of gravity. Machine force is used for conveying only in the region of the bulk material conveyor 6 that leads vertically upward.

Furthermore, technically gas-tight locks 7a to 7d are disposed in the heat carrier circuit, because different atmospheres prevail in the apparatuses through which the bulk material passes, in the order preheating zone 4—heating zone 13—reaction zone 3—cool-down zone 19, depending on the gas that is flowing through the apparatus, in each instance. All mineral and temperature-resistant material can be used as heat carrier media, as granular bulk materials, in the same manner as in EP 1 226 222 B1: sand, gravel, crushed stone, corundum, aluminosilicate, oxide ceramic materials, in general, etc.

The temperature progression of the heat carrier circuit is structured as follows: If one assumes very low heat losses in the bulk material conveyor 6, then the temperatures at the points 6a and 6i mark the temperature base, which is defined by an intermediary heating gas 17 introduced farther down, and can even be very close to ambient temperature, but preferably lies in the temperature range from ambient temperature to 200° C. This is a compulsory point in the process. In contrast, the temperature level at the points 6c and 6d is not determined a priori, but rather depends very significantly on the amount and quality of the product gas formed in the process. This temperature level should level off in the range of 550 to 900° C. In contrast, the temperature level at the points 6e and 6f is another compulsory point, which can be adjusted quite accurately by means of the exhaust gas temperature of the firing 11 with the flue gas 12, and preferably lies in the range of 1050° C. to 1100° C. The temperature at the points 6g and 6h, on the other hand, depends greatly on the progression of the pyrolysis, and is therefore not determined a priori. The pyrolysis temperature preferably lies in the range of 550° C. to 700° C., so that the heat carrier temperature will lie slightly higher, preferably up to 100° K higher, with the ideal goal being a 0° K distance from the pyrolysis temperature.

The essential amount of heat required to carry out the process is coupled into the heat carrier circuit, as in the state of the art, in the heating zone 13, at a high temperature level, preferably 1050° C. to 1100° C. This is done by means of direct heat transfer from a flue gas 12, which is kept in the firing 11 by means of combustion of the pyrolysis coke 10 produced in the pyrolysis apparatus 2, to the bulk material particles, as the gas flows through the heat carrier bulk material situated in the heating zone 13. Afterwards, the residual heat still remaining in the flue gas is used in a heat exchanger 14 for heating the combustion air 16 required in the firing 11, before it is passed on to further purification or—if possible—to the surroundings, as cooled flue gas 15.

As already noted above, the intermediary, gaseous heating medium 17, which is used to cool down the heat carrier circuit at its end, after which the gaseous heating medium heated up in this manner fires the actual pyrolysis, represents an essential part of the invention, which, together with the preheating zone 4, makes the method described here a new process that is certainly different from the state of the art.

This intermediary, gaseous heating medium 17 can be a flue gas, but also ambient air. The former would have the advantage that in this manner, small amounts of residual heat could still be used in the process. In any case, the intermediary, gaseous medium 17 should not be warmer than 200° C., since its temperature, after having passed through a compressor 18, defines the base temperature that is imposed on the heat carrier circuit in a cool-down zone 19 that belongs to the pyrolysis zone, which base temperature is greatly reduced as compared with the state of the art. In this cool-down zone 19, the intermediary, gaseous heating medium 17 is approximately heated to the temperature that the heat carrier circuit has after it leaves the reaction zone 3, in other words generally 600° C. to 800° C. In the heating mantle 2a of the pyrolysis apparatus 2, the intermediary heating medium 17 gives off a large part of its heat. Afterwards, it is used in a boiler 8 to generate the process steam required for the process. In this connection, the boiler has the intermediary heating medium flowing through it on the gas side (8b). Afterwards, the intermediary heating medium leaves the system as substance stream 20.

Fundamentally, it is possible to extract additional heat from the substance stream 20, or to pass it in a circuit.

According to an alternative embodiment, the method according to the invention can also be equipped with a compact pyrolysis apparatus, as shown in FIG. 2. Here, the cool-down zone structured as a pyrolysis compact apparatus is designated with the reference number 119, and has a pyrolysis screw 102, into which the starting material enters, and from which the pyrolysis products 101 exit. The intermediary heating medium 118 is introduced into the cool-down zone 119 by way of a distributor ring 119a, in order to thereby flow uniformly through the heat carrier bulk material situated in the cool-down zone, and cool it down while doing so.

Afterwards, the intermediary heating medium 118 is guided through the inlet 102b into a heating mantle 102a of a pyrolysis screw 102 that lies within the compact apparatus. The cooled-down intermediary heating medium then leaves the heating mantle by way of the outlet 102c. The entering heat carrier stream 106h can completely fill the cool-down zone 119 when this happens, as indicated in FIG. 2. In this connection, the cooled-down heat carrier stream 106l leaves the apparatus at the temperature of the entering intermediary heating medium 118. A possible point for the steam feed into the pyrolysis is indicated with the reference symbol 109. However, this arrangement is not compulsory; the steam can also be introduced at another location that lies ahead of this.

Another advantageous embodiment is also indicated in FIG. 2. Small amounts of air can be introduced into the pyrolysis with a substance stream 121, thereby making it possible to significantly increase the gas yield in the pyrolysis. This is significant because the higher cold gas degree of effectiveness brought about by the special heat management can only be achieved if the amount of coke is so slight that the power of the process firing 11 in FIG. 1 can be controlled by way of the variable return flow of product gas. In contrast, a coke excess would merely have to be burned off in the firing 11, without any additional benefit.

The method of effect can be made clear as follows, using the example:

A wood-like biomass having a residual moisture of 20%, which has an ash content of 2.7% in the dry state, is used. The amount is 573 Kg/h raw, corresponding to the firing heat power of 2.254 MW. The biomass is converted at 95% during pyrolysis, in other words 5% of the material used, without the water component, is supposed to be passed into the product gas, so that a fly coke with 54% ash components is formed, whereby 46% of the remaining, combustible material consists of carbon, at 92%. 870 $Nm^3h$ of a product gas having 46.5% hydrogen and a heating value of 11.7 $MJ/Nm^3$ are formed, whereby the hydrogen concentration and heating value are put into relation with the dry product gas, in each instance, which furthermore contains 30 vol.-% steam. In this way, a cold gas degree of effectiveness of 87.6% is obtained. In this connection, a loss of 50 KW resulting from heat radiation was assumed, along with a residual loss of 129 KW heat in the product gas, which is delivered at 220° C. This includes 110 KW condensation heat of the steam component contained in the raw product gas.

REFERENCE SYMBOL LIST

1 starting material
2 pyrolysis zone
2a heating mantle
3 reaction zone
4 preheating zone
5 product gas
6 bulk material conveyor
7 locks
8 saturated steam boiler
9 steam application
10 pyrolysis coke
11 firing
12 flue gas
13 heating zone
14 heat exchanger
15 flue gas (cooled)
16 combustion air
17 intermediary heating gas
18 compressor
19 cool-down zone
20 substance stream
100 starting material
101 pyrolysis products 102 pyrolysis screw
102a heating mantle
102b inlet
102c outlet
106h entering heat carrier stream
106i cooled-down heat carrier stream
109 steam feed
118 intermediary heating medium
119 cool-down zone
119a distributor ring
122 substance stream (air)

The invention claimed is:

1. A method for producing a product gas including hydrogen, in a system, from a starting material in the form of organic substances or substance mixtures, the method comprising steps of:
    performing pyrolysis on the starting material in a pyrolysis zone of the system to produce solid residues containing carbon and pyrolysis gas as a volatile phase,
    mixing, in the system, the pyrolysis gas with steam as a reactant to form a mixture,
    subsequently heating in a reaction zone of the system the mixture to form a product gas,
    deriving at least some heat required for the pyrolysis and the subsequent heating from combustion of the solid residues containing carbon,
    supplying the at least some heat to the system as a bulk material serving as a heat carrier, transported in a heat carrier circuit of the system,
    heating the heat carrier in a heating zone of the heat carrier circuit with heating gases from the combustion of the solid residues containing carbon,
    subsequently bringing the heat carrier into contact with the mixture in the reaction zone to carry out the subsequent heating,
    then introducing at least part of a palpable heat of the heat carrier into the pyrolysis zone,
    subsequently passing back the heat carrier to a beginning of the heat carrier circuit via a bulk material conveyor of the system, and
    preheating the heat carrier in a preheating zone of the heat carrier circuit, the preheating zone being upstream from the heating zone, the preheating occurring with the product gas from the reaction zone such that the heat carrier takes up a majority of heat of the product gas,
    wherein the introduction of at least part of the palpable heat of the heat carrier into the pyrolysis zone occurs in that heat, from the heat carrier of the heat transfer circuit, is transferred to the starting material in the pyrolysis zone indirectly and without direct contact between the heat carrier and the starting material.

2. The method according to claim 1, wherein the formation of the product gas in the reaction zone is carried out in the presence of a catalyst.

3. The method according to claim 2, wherein the catalyst accelerates the formation of the product gas,
    the method further comprising a step of:
    adding the cataylst to the heat carrier transported in the heat carrier circuit,
    wherein the heat carrier is transported in the heat carrier circuit with the catalyst.

4. The method according to claim 1, further comprising a step of:
    heating, via the heat carrier, an intermediary, gaseous heating medium in a cool-down zone of the heat carrier circuit to produce a heated, intermediary, gaseous, heating medium such that the heat carrier is cooled in the cool-down zone, the cool-down zone being upstream from the bulk material conveyor,
    wherein the pyrolysis is performed in a pyrolysis apparatus having a heating mantle, and
    wherein the transfer of heat from the heat carrier to the starting material occurs in that the heated intermediary, gaseous heating medium gives off heat to the starting material by way of the heating mantle.

5. The method according to claim 4, wherein the cool-down zone of the heat carrier circuit and the heating mantle of the pyrolysis apparatus are combined in a housing, into a single unit.

6. The method according to claim 4, further comprising a step of:
    generating the steam via residual heat remaining in the heated, intermediary, gaseous, heating medium after the heated, intermediary, gaseous, heating medium leaves the pyrolysis zone.

7. The method according to claim 1, wherein the pyrolysis of the starting material is carried out in a temperature range of 500° C. to 700° C.

8. The method according to claim 1, wherein the subsequent heating of the mixture in the reaction zone occurs at temperatures between 750° C. and 1000° C.

9. The method according to claim 1, wherein the heat carrier comprises a fireproof substance.

10. The method according to claim 1, wherein the heat carrier comprises ceramic molded bodies.

11. The method according to claim 1, wherein the transport of the heat carrier in the heat carrier circuit takes place exclusively via gravity, except for a region of the bulk material conveyor.

12. The method according to claim 1, wherein the combustion of the solid residues containing carbon occurs with combustion air,
    the method further comprising a step of:
    preheating the combustion air via a flue gas leaving the heating zone.

* * * * *